(12) United States Patent
Fletcher-Price

(10) Patent No.: US 9,665,185 B2
(45) Date of Patent: May 30, 2017

(54) POINT AND CLICK DEVICE FOR A COMPUTER WORKSTATION

(75) Inventor: Ian George Fletcher-Price, East Sussex (GB)

(73) Assignee: Posturite (UK) Ltd., East Sussex (GB)

(*) Notice: Subject to any disclaimer, the term of this patent is extended or adjusted under 35 U.S.C. 154(b) by 84 days.

(21) Appl. No.: 13/407,134

(22) Filed: Feb. 28, 2012

(65) Prior Publication Data
US 2013/0063346 A1    Mar. 14, 2013

Related U.S. Application Data

(63) Continuation of application No. PCT/GB2010/001603, filed on Aug. 24, 2010.

(30) Foreign Application Priority Data

Aug. 28, 2009 (GB) .................................. 0915129.1

(51) Int. Cl.
G09G 5/08    (2006.01)
G06F 3/0354    (2013.01)

(52) U.S. Cl.
CPC .. G06F 3/03543 (2013.01); *G06F 2203/0332* (2013.01); *G06F 2203/0333* (2013.01); *G06F 2203/0334* (2013.01)

(58) Field of Classification Search
CPC ......... G06F 3/03543; G06F 2203/0332; G06F 2203/0333; G06F 2203/0334
USPC ................ 345/156, 157, 163–166
See application file for complete search history.

(56) References Cited

U.S. PATENT DOCUMENTS

| | | | | |
|---|---|---|---|---|
| 5,894,303 A | * | 4/1999 | Barr | 345/163 |
| 6,545,665 B2 | * | 4/2003 | Rodgers | 345/163 |
| 2006/0007151 A1 | * | 1/2006 | Ram | 345/163 |
| 2008/0094359 A1 | | 4/2008 | Krichbaum | |

FOREIGN PATENT DOCUMENTS

| | | |
|---|---|---|
| GB | 2464925 | 5/2010 |
| GB | 2472880 | 2/2011 |
| WO | 0045366 | 8/2000 |
| WO | 02029537 | 11/2002 |
| WO | 2005022374 | 3/2005 |
| WO | WO 2005022374 A1 * | 3/2005 |

(Continued)

OTHER PUBLICATIONS

International Search Report corresponding to PCT/GB2010/001603 dated Dec. 22, 2010.

(Continued)

*Primary Examiner* — Andrew Sasinowski
(74) *Attorney, Agent, or Firm* — Renner, Otto, Boisselle & Sklar, LLP

(57) ABSTRACT

An ambidextrous point and click device for a computer work station comprising; a body 1 having an inclined back surface 2 configured for supporting the palm of a user's hand and an upright front surface accessible by the fingers of a user's hand when gripping the device, "right click" 3 and "left click" 4 buttons arranged one above the other centrally of the upright front surface, a scroll dial 5 arranged above and in alignment with the "right click" and "left click" buttons and a select button encircling the scroll dial.

7 Claims, 3 Drawing Sheets

(56) References Cited

FOREIGN PATENT DOCUMENTS

WO         2005088432         9/2005

OTHER PUBLICATIONS

Charles W. Moore, Moore's Views & Reviews, "Ergonomic Keyboard and Mouse Solutions for the Mac", Jul. 5, 2002, XP—002613517, downloaded from http://www.applelinks.com/mooresviews/ergo.shtml.
Doug Aamoth, "Mouse Blisters: Adhesive motorcycle grips for your mouse (not blisters)" XP-002613516.
Dumbaugh, Jason; "Evoluent VerticalMouse 3 Rev. 2", Techware Labs, Aug. 21, 2007.
"The AirO2bic (formerly the Quill) Vertical Mouse by Designer Appliances—Detailed Specification Sheet", Designer Appliances Inc., Internet Archive http://www.ergocanada.com/products/mice/quill.html, printed Jan. 10, 2014.

\* cited by examiner

POINT AND CLICK DEVICE FOR A COMPUTER WORKSTATION

This application is a continuation of co-pending International Application No. PCT/GB2010/001603 filed on Aug. 24, 2010, which claims priority of United Kingdom Patent Application No. 0915129.1 filed Aug. 28, 2009, these applications being fully incorporated herewith by reference.

The present invention provides a novel configuration of point and click device of the sort routinely used to interact with a display on a computer monitor.

Hand operated point and click devices are well known. Some different configurations available are generally referred to as; computer mouses, tracker balls and joy sticks.

Computer mouses typically comprise a curved base with two clickable buttons on the front upper surface of the base known as the "right click" and "left click" buttons. Right and left clicking results in different functions being performed on the computer monitor display with which the mouse is being used to interact. Some embodiments include a third "scroll button" in the form of a dial positioned between the "right click" and "left click" buttons. This button is typically used to scroll efficiently through information displayed on a monitor the button is conventionally "clicked" to select an identified piece of data of interest to the user. Using appropriate software, these mouses can conveniently be configured for left or right handed use.

Recent designs of mouse favour a "vertical" arrangement with "right click" and "left click" buttons aligned one above the other on one vertical side of the mouse body and optionally a scroll button on the opposing vertical side. Such arrangements provide that the user's arm may be rested in a more natural position when holding and operating the mouse avoiding pain and injury in the user's arm which can result from rotating the palm towards a horizontal plane for prolonged periods as is experienced when using a conventional mouse arrangement. A downside of such arrangements is that different embodiments must be provided for left and right handed users. The design is not ambidextrous.

The present invention aims to provide a novel point and click device which operates much as a conventional mouse but which is of good ergonomic design and also ambidextrous design so that use can quickly and easily be switched from right to left or left to right hand.

In accordance with the present invention there is provided an ambidextrous point and click device for a computer work station comprising; a body having an inclined back surface configured for supporting the palm of a user's hand and a front surface accessible by the fingers of a user's hand when gripping the device, "right click" and "left click" buttons arranged one above the other centrally of the upright front surface, a scroll dial arranged in alignment with the "right click" and "left click" buttons and a select button associated with the scroll dial.

The device is configured to enable interaction with an on screen display in much the same way as any conventional computer mouse.

The vertical design of the device is considerably more ergonomic than a traditional mouse shape. The design provides for the user to handle and operate the device with his arm in a much more relaxed and natural resting posture and minimises effort on the forearm muscles and wrist joint compared to use of a traditionally shaped mouse.

A particular advantage of the device is that a single embodiment is perfectly suited to right handed and left handed use. This simplifies matters for office staff equipping work stations in that they do not need first to survey staff for left and right handedness or set up any proportion of the point and click devices for left handed users. Furthermore, it removes any barrier to individuals moving their device from one hand to the other on a regular basis, a practice widely encourage by ergonomists and osteopaths.

There is no need for resetting of button functions as is often required with conventional mouse designs and no need to provide a specific left and right hand embodiment with differently placed buttons as has been necessary to date with known vertical mouse configurations. Manufacturers can benefit from greater economies of scale in producing the ambidextrous mouse over producing two different hand embodiments.

The central position of the buttons and their vertical alignment provides that hands of various sizes be they the user's right or left hand may reach and depress the buttons with minimal effort.

The "click" and "select" buttons are generously proportioned to allow easy depression by the fingers of hands in a range of sizes. For example, an average sized hand might depress the button at its centre, a smaller hand at the side nearest to the palm of the user's hand and a large hand at the most distant side. Thus the design is a very ergonomic solution for a range of hand sizes.

Optionally, the device further includes a clip on palm support which lengthens the greatest distance between the upright front surface and inclined back surface to provide greater comfort and hand support for a user with larger than average hands. It is equally conceivable that the device could be provided in a plurality of different sizes to suit different hand sizes.

Optionally the base of the body which, in use, contacts a fixed horizontal surface such as a desk top mouse mat includes a horizontally extending surface on which, in use, the heel of a user's hand may be rested. This feature encourages use of the larger, upper arm muscles when moving the device rather than the smaller muscles of the wrist and forearm which can endure considerable over exertion when conventional mouse designs are used.

The incline of the inclined back surface is selected to encourage a natural and relaxed hand posture when gripping the device, with wrist un-flexed. The distance from the front most surface to the back most surface of the body is selected to allow the device to be gripped comfortably, the "right click" and "left click" buttons being easily depressed by the user's index and middle fingers.

The symmetrical design of the device lends itself comfortably to mass production only one set of tooling being required to produce a device for both left handed and right handed use. Also, it facilitates aesthetic and cosmetic design, for example the shape or colouring of the device could be modified to appear as a cute animal.

The outer casing of the device can be conveniently and cost effectively manufactured on a large scale from plastic materials.

The device may be provided in optical, corded or wireless forms using conventional optical, corded and wireless technologies.

An embodiment of the invention will now be further described with reference to the accompanying figures in which.

Figure 1:
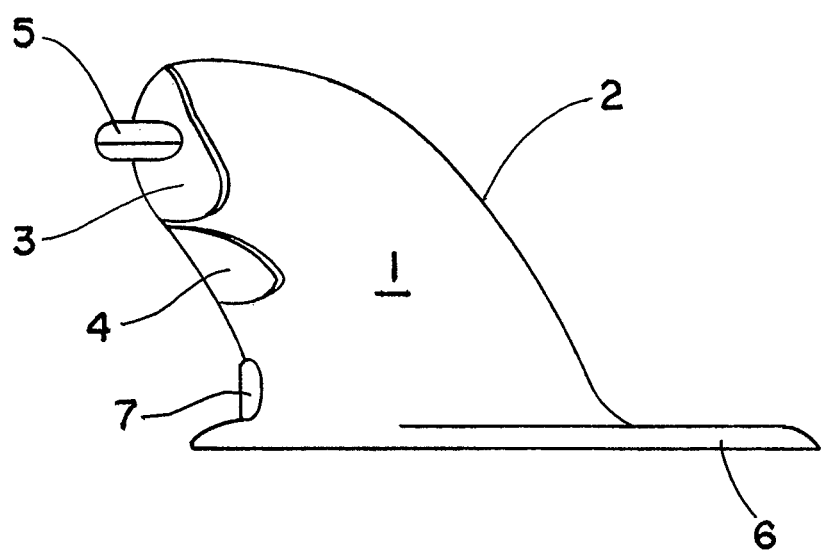
FIG. 1 shows a side view of an embodiment of a point and click device in accordance with the invention.
Figure 4:
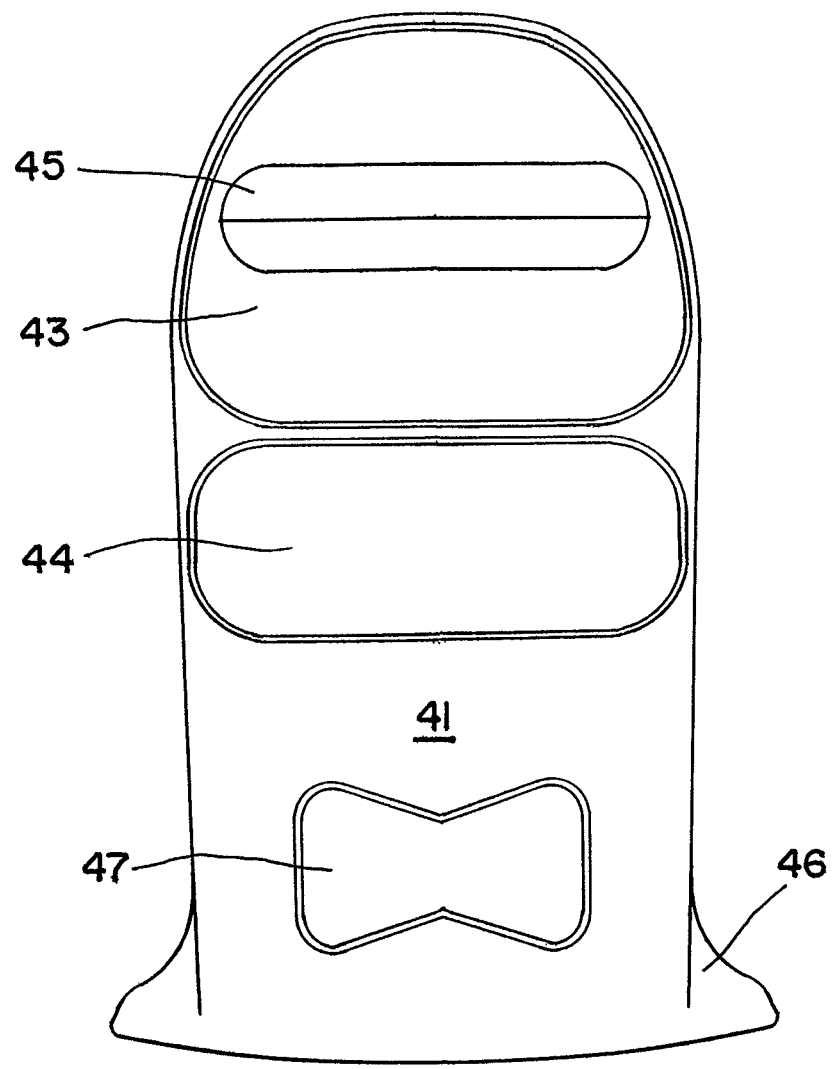

FIG. 4 shows a front view of an alternative embodiment of a point and click device in accordance with the invention As can be seen from FIG. 1 an embodiment of a point and click device in accordance with the invention comprises a body 1 having an inclined back surface 2 configured for supporting the palm of a user's hand and an upright (though slightly inclined) front surface accessible by the fingers of a user's hand when gripping the device, "right click" 3 and "left click" 4 buttons arranged one above the other centrally of the upright front surface. A scroll dial 5 is arranged centrally of the "right click" button in alignment with the "right click" and "left click" buttons. The scroll dial 5 might be configured to depress into the "right click" button so that items can be selected with the scroll button, alternatively, the "right click" button 3 itself may also serve as a select button for the scroll dial 5.

Extending rearwardly from the base of the body 1 is a horizontally extending surface 6 on which, in use, the heel of a users hand can be rested. Incorporated on the undersurface of the base is a tracking ball, optical sensor or other device for locating the position of and any motion of the point and click device.

Optionally, an additional rocker switch 7 is positioned in vertical alignment with the "right click", "left click" and scroll dial buttons for other functions. For example, the rocker switch may operate as a power switch or for panning horizontally across an on screen image.

Figure 2:
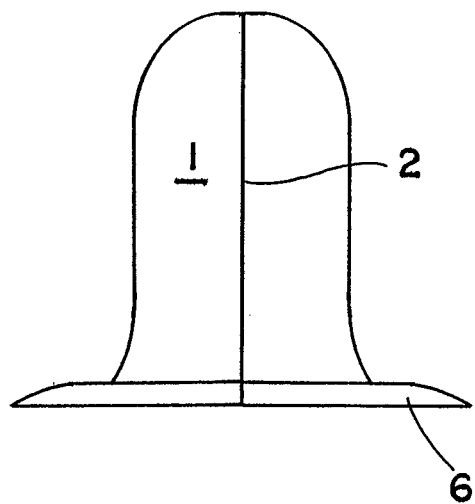
FIG. 2 shows the embodiment of FIG. 1 in rear view.
Figure 3:
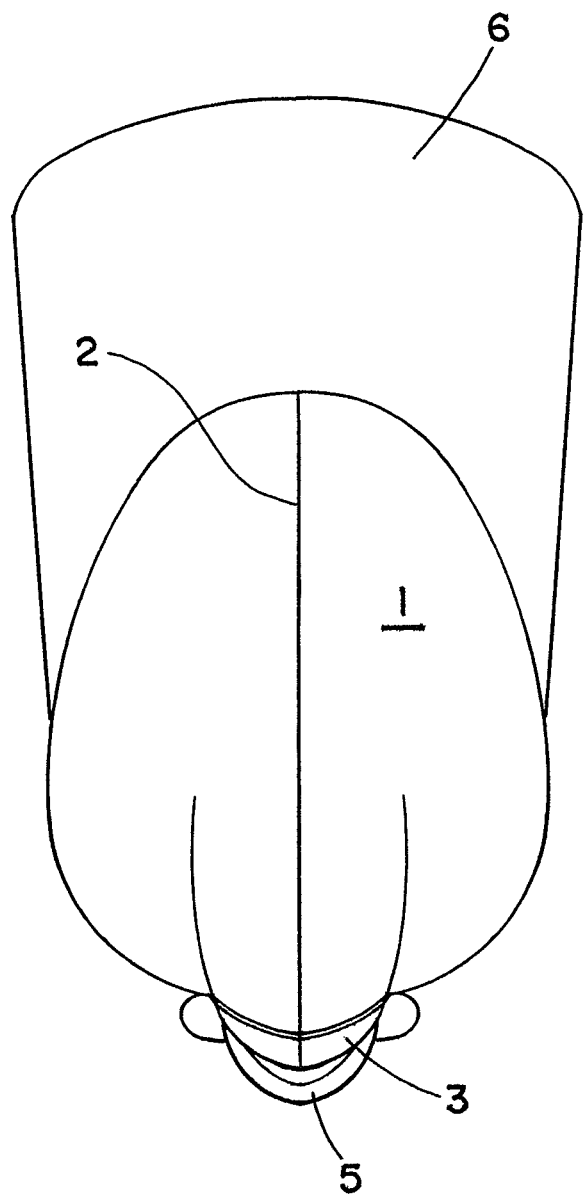
FIG. 3 shows the embodiment of FIGS. 1 and 2 from the top.

The embodiment of FIG. 4 incorporates the same functional buttons as FIGS. 1, 2 and 3 but having slightly different shapes and configuration. The same reference numerals have been used for corresponding elements but prefixed with the number "4".

As can be seen from the figures, the symmetrical layout of buttons not only provides for ambidextrous use of the point and click device but also facilitates aesthetic design, for example mimicking an animal, in this case a penguin.

The invention claimed is:

1. A point and click device for a computer work station, which provides for ambidextrous operation, comprising:
   a body having a forwardly-inclined back surface configured for supporting the palm of a user's hand, wherein the back surface is curved from a lower, rear end to an upper, forward end, a front surface accessible by the fingers of a user's hand when gripping the device, and a base which, in use, contacts a fixed horizontal surface and includes a horizontally-extending surface on which the heel of a user's hand may be rested;
   right-click and left-click buttons which are arranged one above the other centrally of the front surface;
   a scroll dial arranged on the front surface in alignment with the right-click and left-click buttons and rotatable in a horizontal plane about a vertical axis; and
   a select button associated with the scroll dial.

2. The device of claim 1, wherein the select button is integral with the scroll dial.

3. The device of claim 1, further comprising:
   a rocker switch in vertical alignment with the right-click and left-click buttons and being operable as a power switch.

4. The device of claim 1, further comprising:
   a rocker switch in vertical alignment with the right-click and left-click buttons and being for use in panning horizontally across an on-screen image.

5. The device of claim 1, wherein the scroll dial is disposed in vertical alignment with the right-click and left-click buttons.

6. The device of claim 1, wherein the body has symmetrical sides.

7. The device of claim 1, wherein the body has a lateral width and the scroll dial extends across the lateral width of the body.

\* \* \* \* \*